United States Patent [19]

Nishimoto

[11] Patent Number: 5,661,830
[45] Date of Patent: Aug. 26, 1997

[54] WAVEGUIDE-TYPE OPTICAL CONTROL DEVICE

[75] Inventor: Hiroshi Nishimoto, Tokyo, Japan

[73] Assignee: NEC Corporation, Tokyo, Japan

[21] Appl. No.: 560,680

[22] Filed: Nov. 20, 1995

[30] Foreign Application Priority Data

Nov. 18, 1994 [JP] Japan ............................ 6-309707

[51] Int. Cl.$^6$ .......................... G02B 6/12; G02F 1/035
[52] U.S. Cl. ............................ 385/40; 385/2; 385/14
[58] Field of Search ........................ 385/2, 8, 14, 40, 385/41, 131, 132

[56] References Cited

U.S. PATENT DOCUMENTS

| | | | |
|---|---|---|---|
| 4,861,126 | 8/1989 | Dautartas et al. | 385/40 |
| 5,153,930 | 10/1992 | DuPuy et al. | 385/8 |
| 5,153,934 | 10/1992 | Okayama et al. | 385/8 |
| 5,339,369 | 8/1994 | Hopfer et al. | 385/2 |
| 5,473,711 | 12/1995 | Hakogi et al. | 385/14 |
| 5,479,552 | 12/1995 | Kitamura et al. | 385/132 |
| 5,526,448 | 6/1996 | Nagata et al. | 385/2 |

FOREIGN PATENT DOCUMENTS

| | | |
|---|---|---|
| 62-73207 | 4/1987 | Japan . |
| 62-073207 | 4/1987 | Japan . |
| 62-173428 | 7/1987 | Japan . |
| 1-302325 | 12/1989 | Japan . |
| 3-253815 | 11/1991 | Japan . |

OTHER PUBLICATIONS

H. Nishimoto et al., "Polarization Independent 8 × 8 LiNbO$_3$ Optical Matrix Switch", *Electronic Information Communication Society*, OQE88–147, pp. 67–74, 1988.

C. Gee et al., "Minimizing dc drift in LiNbO$_3$ waveguide devices", Applied Physics Letters, Aug. 1985, vol. 47, No. 3, pp. 211–213.

*Primary Examiner*—Rodney B. Bovernick
*Assistant Examiner*—Hemang Sanghavi
*Attorney, Agent, or Firm*—Young & Thompson

[57] ABSTRACT

Disclosed is an optical control device which has a substrate with a pyroelectric effect; optical waveguides formed on the surface of the substrate; a pair of electrodes formed near the optical waveguides; a film layer formed between the substrate and the electrodes; and conductive film which covers near the electrodes and has a conductivity higher than that of the film layer; wherein the conductive film has a plurality of insulating portions between the electrodes.

6 Claims, 5 Drawing Sheets

WAVEGUIDE-TYPE OPTICAL CONTROL DEVICE

FIELD OF THE INVENTION

This invention relates to an optical control device for switching light paths, modulating a light wave and filtering a light wavelength, and more particularly to, an optical control device of a waveguide type in which the control is carried out by using optical waveguides.

BACKGROUND OF THE INVENTION

Along with the utilization of an optical communication system, a large capacity and multi-function system is desired. Also, enhanced functions such as high-speed generation of optical signal, high-speed switching of optical transmission lines, and high-speed exchanging are required.

As a means for switching optical transmission lines and exchanging in a network, an optical switch is used. The optical switch now available is operated by switching light paths according to the mechanical movement of a prism, mirror, fiber or the like. However, it has problems that the operating speed is low and that it is too large to construct a matrix switch. To overcome the problems, a waveguide-type optical switch which employs optical waveguides has been developed. It has advantages in that the high-speed operating, integration of numerous elements and high reliability can be realized. In particular, the optical switch which employs a ferroelectric material such as lithium niobate ($LiNbO_3$) or the like has low light absorption and high efficiency caused by the large electrooptic effect. Various types of optical control devices are reported, for example, a directional-coupler type, mach-zender type, balance-bridge type, total internal reflection type optical switch.

Recently, the high-density integration of the waveguide-type optical switch using a directional coupler which is formed in an electrooptic effect $LiNbO_3$ crystalline substrate has been developed. H. Nishimoto (the inventor of this application) et al., "Polarization Independent 8×8 $LiNbO_3$ Optical Matrix Switch", Electronic Information Communication Society, OQE88-147, pp.67–74 reports the 8×8 matrix optical switch in which 64 directional-coupler type optical switches is integrated in the $LiNbO_3$ crystalline substrate. Also, a device such as an external optical modulator which comprises a single optical switch has been developed.

The characteristics concerning such waveguide-type devices are stability in operation, switching voltage (power), crosstalk, extinction ratio, loss, switching speed and so on. Most important points of these characteristics are stability in operation and reduction in switching voltage (power).

A conventional optical control device has in general a structure in which a directional coupler consisting of two optical waveguides are formed in a $LiNbO_3$ or $LiTiO_3$ substrate which has a pyroelectric effect.

However, in such optical control device, there is a problem in reliability that the localization of an electric charge generated with temperature change due to the pyroelectric effect causes the voltage change of operating point, i.e., temperature drift.

To overcome the problem, another conventional optical control device is suggested(Japanese patent application laid-open Nos. 62-73207, 62-173428). In such device, the conduction between a pair of electrodes is provided by conductive film, whereby the electric charge generated with temperature change is uniformed to suppress the temperature drift.

However, in this device, it is required that the resistance value between the electrodes through the conductive film be $10^7$ to $10^{10} \Omega$. Low resistance value is defined to avoid the operation error caused by leak current between the electrodes. Upper resistance value is determined to suppress the temperature drift. Thus, it requires a strict temperature management in thermal treatment process to control the resistance value. As a result, the process is complicated and the product yield is reduced.

Furthermore, since the electrodes are electrically conducted, a carrier such as an impurity may easily move inside and at the surface of the conductive film and at the interface between the conductive film and a contacting layer thereto when an external potential difference is applied between the electrodes to operate the device. When the carrier movement occurs, the external applied voltage will be canceled between the electrodes. Namely, in the above device, there is also a problem in reliability that optical output-applied voltage characteristics shifts when a DC voltage is continuously applied, i.e., DC drifting.

On the other hand, a conventional optical control device, in which the operating voltage is reduced when the conduction between electrodes is provided by conductive film is suggested (Japanese patent application laid-open No. 1-302325).

In this device, a buffer layer is formed only on two optical waveguides and is covered with conductive film, a potential difference is applied between the electrodes through the conductive film.

In this structure, the potential difference generated between the two optical waveguides is nearly equal to a value obtained by subtracting two vertical voltage drops from the external applied voltage. It is apparent that the vertical and horizontal voltage drops are simply determined by the ratio of vertical and horizontal lengths of the conductive film between the electrodes.

Accordingly, the potential difference generated between the optical waveguides in this structure is not so different from that in the other conventional devices. Therefore, the operating voltage is not so reduced.

SUMMARY OF THE INVENTION

Accordingly, it is an object of the invention to provide an optical control device in which the DC drifting is suppressed as well as the temperature drift.

It is a further object of the invention to provide an optical control device in which conductive film for preventing the temperature drift can be easily formed.

It is a still further object of the invention to provide an optical control device in which operating voltage is lowered.

According to the invention, an optical control device, comprises:

a substrate with a pyroelectric effect;

optical waveguides formed on the surface of the substrate;

a pair of electrodes formed near the optical waveguides;

a film layer formed between the substrate and the electrodes; and conductive film which covers near the electrodes and has a conductivity higher than that of the film layer;

wherein the conductive film has a plurality of insulating portions between the electrodes.

Herein, the thickness of film layer(buffer layer) between the electrodes may be partially or entirely thinned. Further, the film layer between the electrodes may be partially or entirely removed and a insulating material with a higher insulation resistivity than that of the film layer may be disposed in the removed portion.

The insulating portions in the conductive layer between the electrodes is preferably disposed near the electrodes.

Meanwhile, the pyroelectric effect means that electric charge is generated and focused at the position where temperature is changed due to atmospheric temperature etc. It can be brought by $LiNbO_3$, $LiTiO_3$ etc.

In an optical control device according to the invention, conductive film has a plurality of insulating portions between electrodes. Thereby, the localization of electric charge generated by the pyroelectric effect can be suppressed to prevent the temperature drift. Also, a restriction as to the resistance value of the conductive film can be removed to improve the product yield.

Further, since the insulating portions are formed near the electrodes, the voltage drop of an external applied voltage occurs at the insulating portions to reduce the voltage applied to the conductive film. Therefore, the voltage inside and at the surface of the conductive film and at the interface between the conductive film and a contacting layer thereto, which may cause the movement of a carrier such as an impurity which results in the DC drifting, is lowered. As a result, the carrier movement can be suppressed to provide an optical control device with the reduced DC drifting.

Further, since the insulating portions are formed near the optical waveguides, the potential difference generated between the optical waveguides to an external applied voltage for determining the operating voltage can be increased. Therefore, the operating at a low voltage can be provided.

BRIEF DESCRIPTION OF THE DRAWINGS

The invention will be explained in more detail in conjunction with the appended drawings, wherein.

DESCRIPTION OF THE PREFERRED EMBODIMENTS

Before explaining an optical control device in the preferred embodiment, the aforementioned conventional devices will be explained in FIGS. 1 to 3.

Figure 1:
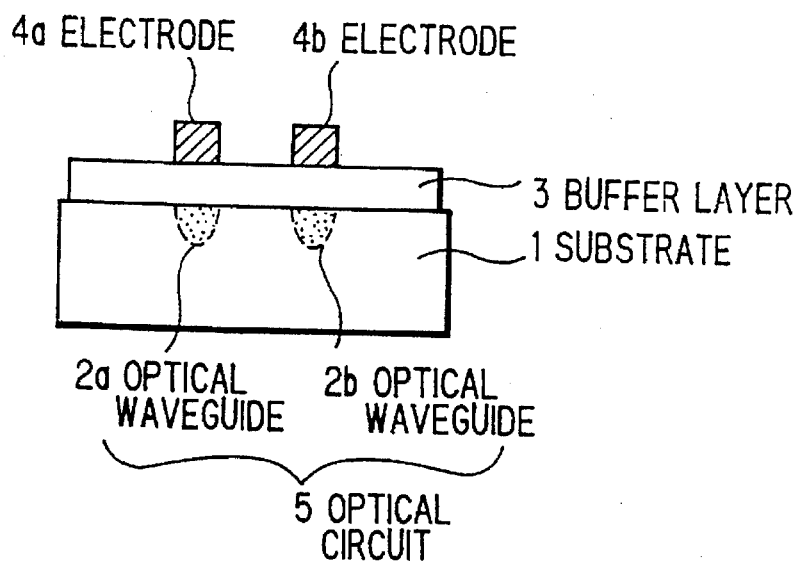
FIG. 1 is a cross sectional view showing a conventional optical control device.

FIG. 1 shows a conventional optical control device in which a directional coupler 5 consisting of two optical waveguides are formed in the $LiNbO_3$ or $LiTiO_3$ substrate which has a pyroelectric effect.

As shown in FIG. 1, a buffer layer 3 which is optically opaque film is used as a optical buffer layer to prevent waveguided light from being absorbed by electrodes 4a, 4b to which an external control signal is applied to control the waveguided light. The optical buffer layer 3 is generally made of silicon dioxide. Because, silicon dioxide hardly absorbs light and the refractive index thereof is sufficiently low as compared with that of $LiNbO_3$ or $LiTiO_3$ substrate.

The electrodes 4a, 4b are generally made of a metal with a low volume resistivity so as to realize a high-speed operation and are disposed near the optical waveguides 2a, 2b.

Figure 2:
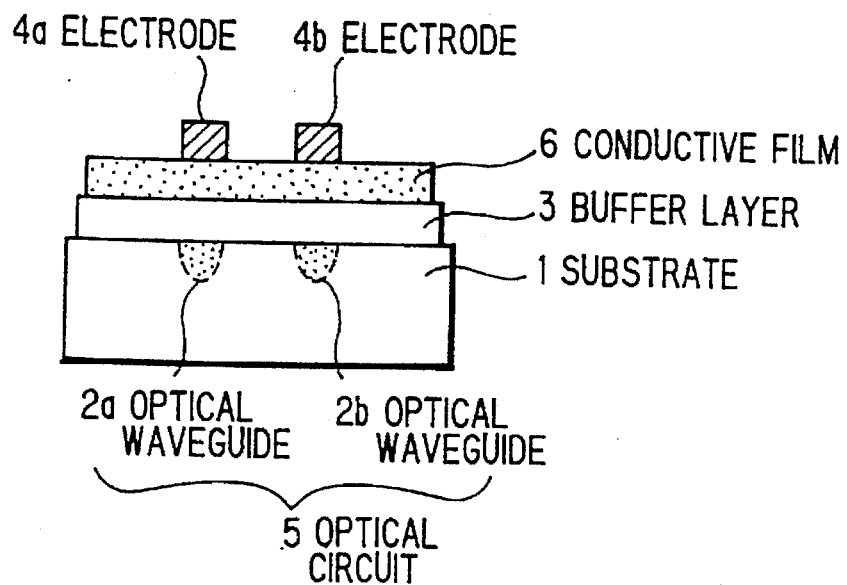
FIG. 2 is a cross sectional view showing another conventional optical control device.

Another conventional optical control device is shown in FIG. 2 (Japanese patent application laid-open Nos. 62-73207, 62-173428). In such device, the conduction between a pair of electrodes 4a and 4b is provided by conductive film 6, whereby the electric charge generated with temperature change is uniform to suppress the temperature drift.

Figure 3:
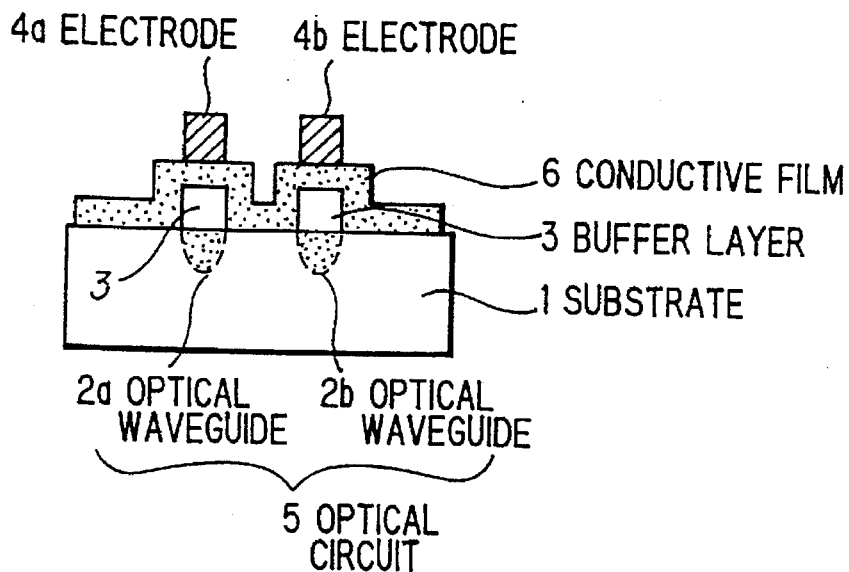
FIG. 3 is a cross sectional view showing another conventional optical control device.

Further, another conventional optical control device is shown in FIG. 3, in which operating voltage is reduced when the conduction between electrodes is provided by conductive film is suggested (Japanese patent application laid-open No. 1-302325).

In this device, a buffer layer 3 is formed only on two optical waveguides 2a, 2b and is covered with conductive film 6, a potential difference is applied between the electrodes 4a and 4b through the conductive film 6.

Herein, the potential difference generated between the two optical waveguides 2a and 2b for determining an operating voltage is determined by the respective voltage drops vertical and horizontal to a substrate 1 at the conductive film 6 when the conduction between the electrodes 4a and 4b is provided by the conductive film 6.

Namely, in this structure, the potential difference generated between the two optical waveguides 2a and 2b is nearly equal to a value obtained by subtracting two vertical voltage drops from the external applied voltage. It is apparent that the vertical and horizontal voltage drops are simply determined by the ratio of vertical and horizontal lengths of the conductive film 6 between the electrodes 4a and 4b.

Next, an optical control device in the first preferred embodiment will be explained in FIG. 4, wherein like parts are indicated by like reference numerals as used in FIGS. 1 to 3.

Figure 4:
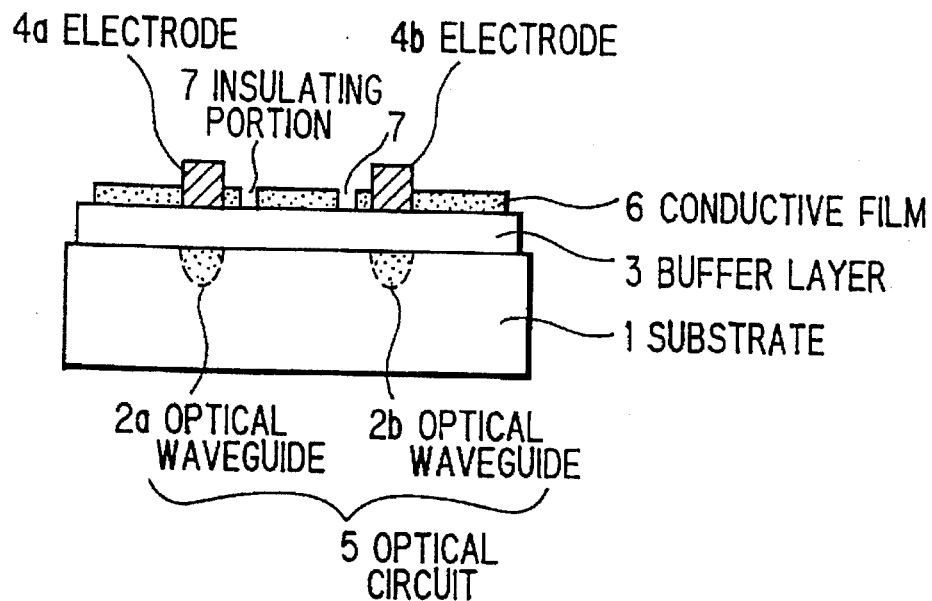
FIG. 4 is a cross sectional view showing an optical control device in a first preferred embodiment according to the invention.

FIG. 4 shows the optical control device which comprises a $LiNbO_3$ substrate 1, an optical circuit 5 comprising two channel-type optical waveguides 2a, 2b formed on the surface of the $LiNbO_3$ substrate, a buffer layer 3 formed on the substrate, electrodes 4a, 4b formed on the buffer layer 3, and conductive film 6 formed adjacent to the electrodes 4a, 4b.

Herein, the conductive film 6 is not formed to entirely connect between the electrodes 4a and 4b and has insulating portions 7 near the electrodes 4a, 4b. Meanwhile, the optical circuit 5 is directional-coupled type, mach-zender type, balance-bridge type or the like.

The buffer layer 3 functions to prevent the electrodes 4a, 4b from absorbing waveguided light since it is made of a material which is optically opaque and has a refractive index less than that of the substrate. Also, it functions to control the speed of microwave propagating through the electrodes 4a, 4b by changing dielectric constant, thickness etc. of the buffer layer 3, when microwave is applied to the electrodes 4a, 4b.

Such functions are brought by a material which has lower conductivity than that of the conductive film 6, i.e., higher insulating level than that of conductive film 6. Such material is preferably silicon dioxides and may include ITO (InO$_3$–SnO$_2$), Al$_2$O$_3$, MgF$_2$, SION, Si$_3$N$_4$ or silicon dioxides doped with phosphorus, titanium, boron, germanium etc.

The depositing of the buffer layer 3 may be performed by CVD method, sputtering method, deposition method etc.

The electrodes 4a, 4b may be made of various conductive materials such as Au, Al, Mo, Cu, WSi, ITO, zinc oxides, conductive polymer etc.

Though the conductive film 6 is made of silicon in this embodiment, it may be made of another conductive material including metal such as Au, Al, Mo, Cu, WSi, ITO, zinc oxides, conductive polymer and a semiconductor material such as silicon etc.

The insulating portions 7 are formed by removing a part of the conductive film 6 to provide insulation between the electrodes 4a and 4b. It may be formed by the standard photolithography.

The material of the substrate 1 is not limited to LiNbO$_3$ and may include a material which has a pyroelectric effect, such as LiTiO$_3$. The number of the insulating portions is not limited to two, and it is apparent that more than two insulating portions can also have a similar effect to that.

In this embodiment, in which the insulation between the electrodes 4a and 4b is provided only at a part of the conductive film 6, it has been found that the localization of electric charge which is caused by the pyroelectric effect with the change of temperature does not occur and electric charge is uniformly distributed on the surface of the substrate 1 not to bring the temperature drift.

Hereon, in a conventional optical control device, it is required that the resistance value between the electrodes 4a and 4b through the conductive film 6 be $10^7$ to $10^{10}\Omega$ to avoid the operation error caused by leak current between the electrodes 4a and 4b. Thus, the material of the conductive film 6 is restricted, as well as requiring a strict temperature management in thermal treatment process to control the resistance value. As a result, the process is complicated and the product yield is reduced.

Accordingly, by this embodiment, such restriction regarding the material and resistance value of the conductive film can be removed to improve the product yield.

On the other hand, in the structure as shown in FIG. 4, it is apparent that the voltage drop in external applied voltage is small at the conductive film 6 and large at the insulating portions 7. Therefore, the voltage at the inside and the surface of the conductive film 6 and at the interface between the conductive film 6 and a contacting layer thereto, which may cause the movement of a carrier such as an impurity which results in the DC drifting, is lowered. As a result, the carrier movement can be suppressed to provide an optical control device with the reduced DC drifting.

Figure 5A:
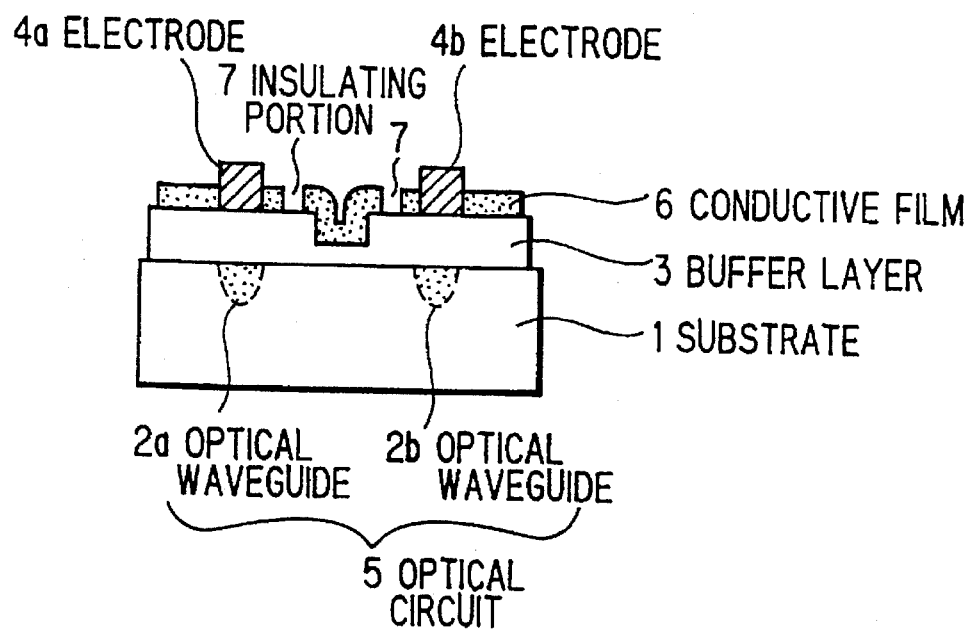
FIGS. 5A and 5B are cross sectional views showing optical control devices in a second preferred embodiment according to the invention.
Figure 5B:
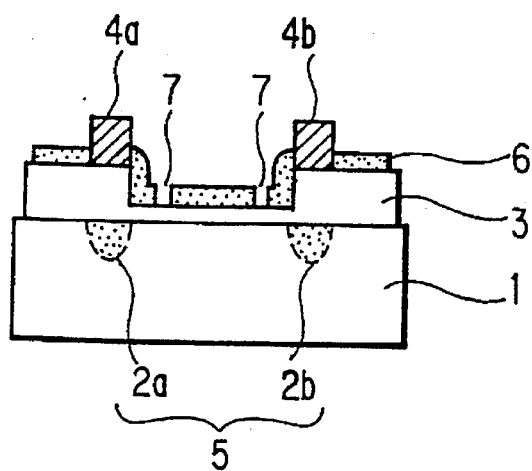

FIGS. 5A and 5B show optical control devices in the second preferred embodiment. As shown in FIG. 5A, two insulating portions 7 are formed adjacent to electrodes 4a, 4b and a part of a buffer layer 3 between the electrodes 4a and 4b is thinned as compared with the other part thereof.

In the second embodiment, the effects as to the temperature drift and DC drifting in the first embodiment are similarly obtained.

Furthermore, the operating at a low voltage is possible since the insulating portions 7 are formed near the electrodes 4a, 4b. When the conduction between the electrodes 4a and 4b is obtained through the conductive film 6, the potential difference generated between two optical waveguides 2a and 2b to an external applied voltage for determining the operating voltage is determined by the voltage drops vertical and horizontal to a substrate 1 at the conductive film 6. However, in the second embodiment, the voltage drops vertical and horizontal to the substrate 1 are generated at the buffer layer 3 since the voltage is scarcely applied to the conductive film 6 horizontal to the substrate 1. Here, since a part of the buffer layer 3 between the electrodes 4a and 4b is thinned, the resistance value horizontal to the substrate 1 becomes large, thereby increasing the horizontal voltage drop of the external applied voltage as compared with the conventional device.

Accordingly, the potential difference generated between the two optical waveguides horizontal to the substrate 1 becomes large to facilitate the operating at a low voltage.

In this embodiment, the buffer layer 3 is made of silicon dioxide and the thinning of the buffer layer 3 is performed by the standard photolithography. The substrate 1, optical waveguides 2a, 2b and conductive film 6 are similar to those in the first embodiment.

FIG. 5B shows an altered structure in the second embodiment, in which a buffer layer 3 between the electrodes 4a and 4b is thinned compared with the other part and two insulating portions are formed on the thinned buffer layer 3 near the electrodes 4a, 4b. Because of this structure, the voltage drop vertical to the substrate 1 is substantially determined by the conductive film 6 which has a resistance value less than the buffer layer 3, and the voltage drop horizontal to the substrate 1 is determined by the thinned buffer layer 3 which has a large resistance value. Therefore, the operating at a lower voltage than the structure in FIG. 5A can be realized.

Figure 6A:
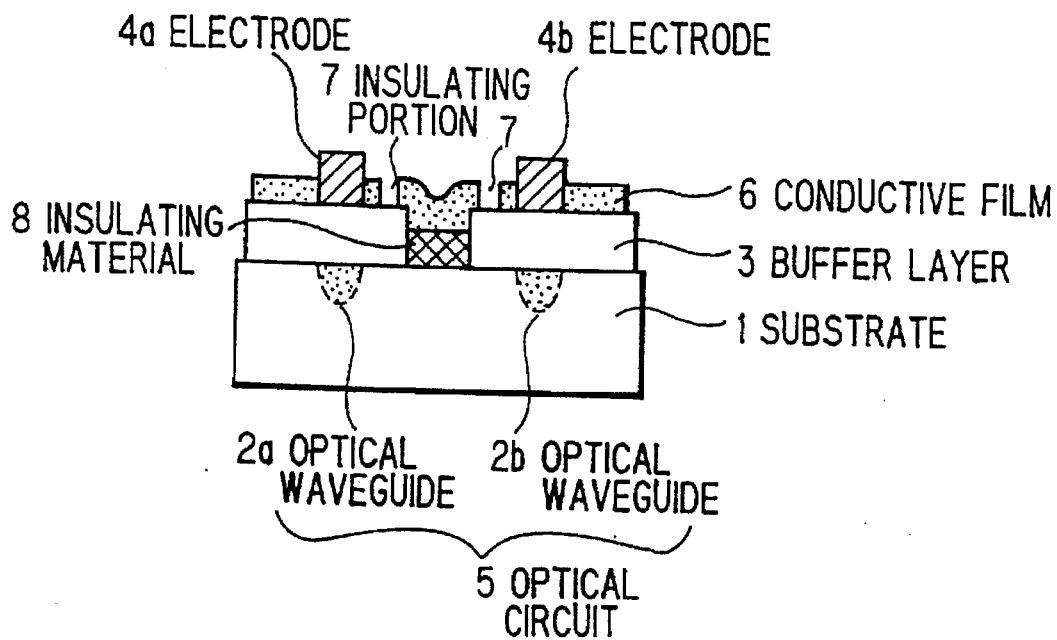
FIGS. 6A and 6B are cross sectional views showing optical control devices in a third preferred embodiment according to the invention.
Figure 6B:
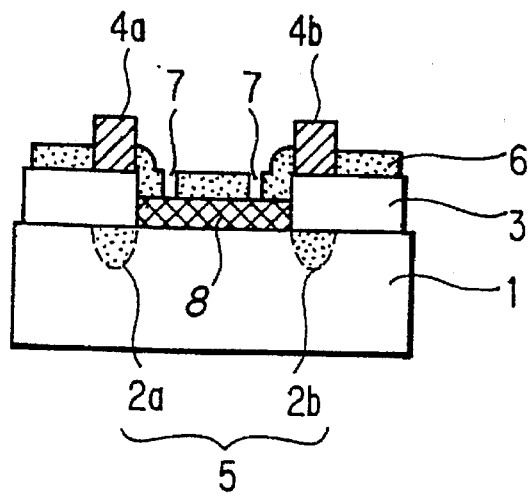

FIGS. 6A and 6B show optical control devices in the third preferred embodiment.

As shown in FIG. 5A, two insulating portions 7 are formed near electrodes 4a, 4b, a part of a buffer layer 3 between the electrodes 4a and 4b is removed, and insulating material 8 which has an insulation resistance higher than that of the buffer layer 3 is formed on the removed part.

In the third embodiment, the effects as to the temperature drift and DC drifting in the second embodiment are similarly obtained.

Furthermore, the operating at a low voltage can be easily obtained since the resistance value horizontal to the substrate 1 can be easily increased as compared with the structure with thinned buffer layer 3 in FIG. 5A or 5B.

In the third embodiment, the buffer layer 3 is made of silicon dioxide doped with phosphorus(PSG) and the insulating material 8 is made of non-doped silicon dioxide (NSG). The resistance value of PSG can be reduced to about one fifth to one 10 millionth of that of NSG, by selecting the concentration of phosphorus. Namely, the potential difference horizontal to the substrate 1 can be brought nearly to the same voltage as an external applied voltage. Thereby, the operating at a low voltage can be realized. The partial removal of the buffer layer 3 and formation of the insulating material 8 are performed by the standard photolithography. Optical waveguides 2a, 2b and conductive film 6 are formed by using the same material and method in the first embodiment.

Meanwhile, the combination of materials used for the buffer layer 3 and the insulating material 8 is not limited to the above example. If the material for the buffer layer 3 and insulating material 8 is less conductive than that for the conductive film 6 and the insulation resistance of the insulating material 8 is greater than that of the buffer layer 3, any combination therebetween can be employed.

FIG. 6B shows an altered structure in the third embodiment, in which a buffer layer 3 between the electrodes 4a and 4b is almost removed and two insulating portions are formed on insulating material 8 near the electrodes 4a, 4b. Because of this structure, the voltage drop vertical to the substrate 1 is substantially determined by the conductive film 6 which has a resistance value less than the buffer layer 3, and the voltage drop horizontal to the substrate 1 is determined by the insulating material 8 which has a large resistance value. Therefore, the operating at a lower voltage than the structure in FIG. 6A can be realized.

Figure 7A:
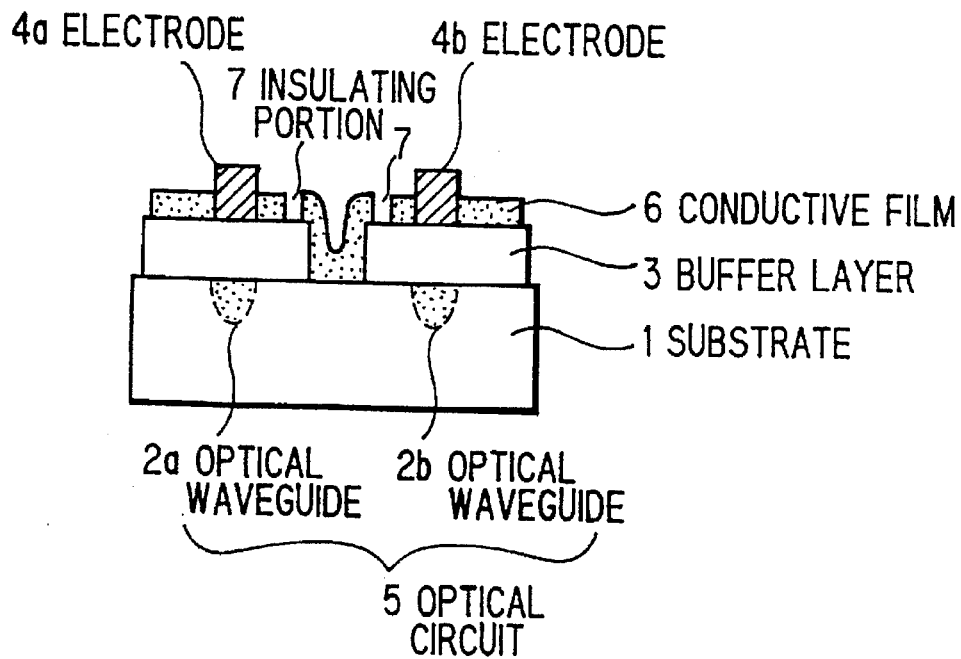
FIGS. 7A and 7B are cross sectional views showing optical control devices in a fourth preferred embodiment according to the invention.
Figure 7B:
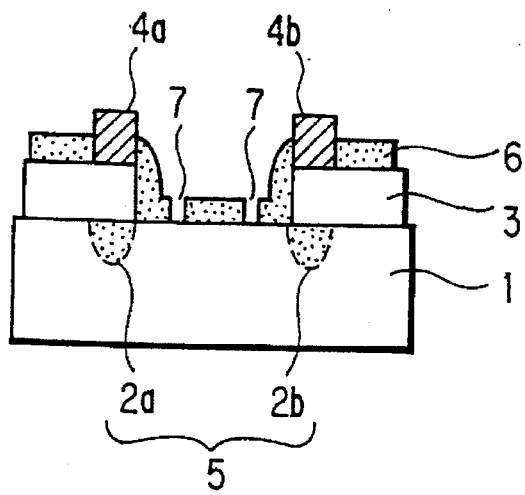

FIGS. 7A and 7B show optical control devices in the fourth preferred embodiment.

As shown in FIG. 7A, two insulating portions 7 are formed near electrodes 4a, 4b and a part of a buffer layer 3 between the electrodes 4a and 4b is removed. Similarly in the second and third embodiments, the resistance horizontal to the substrate 1 is increased. Also, the effects as to the temperature drift and DC drifting in the second and third embodiments are similarly obtained.

The partial removal of the buffer layer 3 is performed by the standard photolithography. The substrate 1, optical waveguides 2a, 2b and conductive film 6 are formed by using the same material and method as in the first embodiment.

FIG. 7B shows an altered structure in the fourth embodiment, in which a buffer layer 3 between the electrodes 4a and 4b is almost removed and two insulating portions are formed on the surface of the substrate 1 near the electrodes 4a, 4b. Because of this structure, the voltage drop vertical to the substrate 1 is substantially determined by the conductive film 6, and the voltage drop horizontal to the substrate 1 is determined by the substrate 1 which has normally a large resistance value than that of the buffer layer 3.

The substrate 1, optical waveguides 2a, 2b and conductive film 6 in FIG. 7B are formed by using the same material and method as in the first embodiment. The volume resistivity of the LiNbO₃ substrate is about two to thousand times of that of the SiO₂ buffer layer 3. Therefore, the operating at a lower voltage than the structure in FIG. 7A can be realized.

Although the invention has been described with respect to specific embodiment for complete and clear disclosure, the appended claims are not to be thus limited but are to be construed as embodying all modifications and alternative constructions that may be occur to one skilled in the art which fairly fall within the basic teaching herein is set forth.

What is claimed is:

1. An optical control device, comprising:

a substrate having a pyroelectric effect;

optical waveguides formed on the surface of said substrate;

a pair of electrodes formed near said optical waveguides;

a buffer layer formed between said substrate and said electrodes; and conductive film, which coy, ere an area adjacent said electrodes, avoids an area below said electrodes and has a conductivity higher than that of said buffer layer;

said conductive film having a plurality of insulating portions between said electrodes;

said conductive film having two insulating portions formed near said electrodes; and a thickness of one part of said buffer layer between said electrodes being less than that of another part of said buffer layer, whereby the lateral resistance value of the buffer layer farmed between the electrodes is increased.

2. An optical device, according to claim 1, wherein said two insulating portions are formed on the surface of said buffer layer.

3. An optical control device, according to claim 1, wherein:

one part of said buffer layer between said electrodes is removed.

4. An optical control device, according to claim 3, wherein:

said buffer layer between said electrodes is all removed; and said insulating portions are formed on the surface of said substrate.

5. An optical control device, comprising:

a substrate having a pyroelectric effect;

optical waveguides formed on the surface of said substrate;

a pair of electrodes formed near said optical waveguides;

a buffer layer formed between said substrate and said electrodes; and conductive film, which covers an area adjacent said electrodes, avoids an area below said electrodes and has a conductivity higher than that of said buffer layer;

said conductive film having a plurality of insulating portions between said electrodes;

said conductive film having two insulating portions which are formed near said electrodes; one part of said buffer layer between said electrodes being removed; and a material with a higher insulation resistivity than that of said buffer layer being disposed in said removed part of said buffer layer.

6. An optical control device, according to claim 5, wherein:

said buffer layer between said electrodes is all removed; a material with a higher insulation resistivity than that of said buffer layer is disposed in said removed part of said buffer layer; and said insulating portions are formed on said material with said higher insulation resistivity.

* * * * *